United States Patent [19]

Shepherd et al.

[11] Patent Number: 4,835,214

[45] Date of Patent: May 30, 1989

[54] POLYMER BLENDS USEFUL FOR HOT FILLABLE CONTAINERS HAVING IMPROVED GAS BARRIER PROPERTIES

[75] Inventors: Freddie A. Shepherd, Kingsport; Henry Gonzalez, Jr., Blountville; Steven L. Hess, Mount Carmel, all of Tenn.

[73] Assignee: Eastman Kodak Company, Rochester, N.Y.

[21] Appl. No.: 123,689

[22] Filed: Nov. 23, 1987

[51] Int. Cl.$^4$ .................. C08L 67/02; C08L 29/04
[52] U.S. Cl. .................. 525/58; 525/931; 525/933; 215/1 C
[58] Field of Search .............. 525/58, 931, 933; 215/1 C

[56] References Cited

U.S. PATENT DOCUMENTS

| | | | |
|---|---|---|---|
| 3,585,177 | 6/1971 | Gardner et al. | 260/87.3 |
| 3,595,740 | 7/1971 | Gerow | 161/254 |
| 3,733,309 | 5/1973 | Wyeth et al. | 260/75 T |
| 3,733,369 | 5/1973 | Shepherd, Jr. | 260/680 R |
| 3,778,214 | 12/1973 | Wyeth et al. | 425/326 |
| 4,261,473 | 4/1981 | Yamada et al. | 215/1 C |
| 4,267,143 | 5/1981 | Roullet | 264/516 |
| 4,284,671 | 8/1981 | Cancio et al. | 428/35 |
| 4,732,799 | 3/1988 | Sakamoto | 428/141 |

FOREIGN PATENT DOCUMENTS 1545096  5/1979  United Kingdom .

OTHER PUBLICATIONS

Vassallo & Harden, Analytical Chemistry, vol. 34, Jan., 1962, pp. 132–135.
Heffelfinger & Burton, Journal of Polymer Science, vol. XLVII, pp. 289–306.
Heffelfinger & Schmidt, Journal of Applied Polymer Sciences, vol. 9, p. 2661 (1965).

*Primary Examiner*—John C. Bleutge
*Assistant Examiner*—David Buttner
*Attorney, Agent, or Firm*—John F. Stevens; William P. Heath, Jr.

[57] ABSTRACT

Blends of poly(ethylenenaphthalene 2,6-dicarboxylate) with olefin/vinyl alcohol copolymers having improved resistance to oxygen permeability are disclosed. Also disclosed are shaped articles such as biaxially oriented containers produced therefrom.

5 Claims, 2 Drawing Sheets

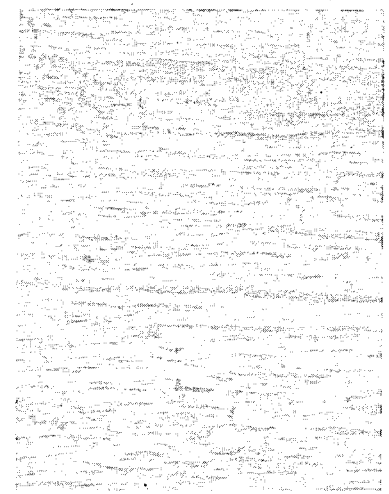
Fig. 2  PEN./EVOH  80/20
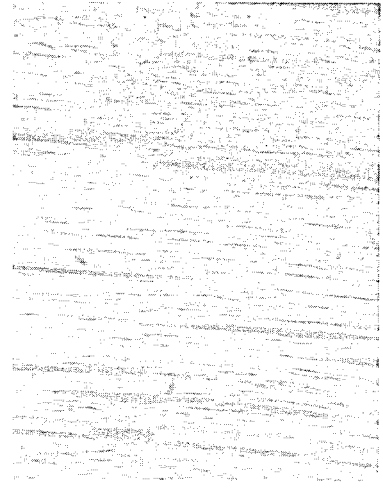
Fig. 1  PEN/EVOH  90/10

PET / EVOH
(For Comparison)
90/10

PET / EVOH
(For Comparison)
80/20

POLYMER BLENDS USEFUL FOR HOT FILLABLE CONTAINERS HAVING IMPROVED GAS BARRIER PROPERTIES

TECHNICAL FIELD

This invention relates to blends of poly(ethylenenaphthalene 2,6-dicarboxylate), herein referred to as PEN, and olefin/vinyl alcohol copolymer (EVOH) having greatly improved gas barrier properties. This invention also relates to biaxially oriented containers produced from such blends.

BACKGROUND ART

In the field of packaging materials, polyesters have rapidly developed in recent years. In particular, polyethylene terephthalate (PET), by a process of stretch-blowing preforms, has shown a remarkable aptitude for fabrication of bottles with excellent mechanical properties (notably shock resistance and resistance to internal pressure), allowing for their advantageous usage in the packaging of pressurized liquids such as carbonated beverages. However, occasionally when dealing with highly flavored liquids and/or oxygen sensitive liquids and/or carbonated liquids, the packaged product is deficient from the standpoint of preservation where the polyethylene terephthalate hollow bodies are not sufficiently gas or flavor impervious. This is even more so when the body wall is thin and when the ratio of the surface of the receptacle to the volume of the contents is significant. See, for example, U.S. Pat. Nos. 3,733,309 and 4,267,143.

It is also known in the art that polymers such as PET can be laminated to EVOH to improve the gas barrier properties of these polymers. See, for example, U.S. Pat. No. 3,595,740. It is also known in the art that blends of PET and EVOH are useful in making containers having good gas barrier properties.

Other patents of interest in this field are G.B. Pat. No. 1,545,096 and U.S. Pat. Nos. 4,261,473; 4,282,671 and 3,585,177.

It is not believed to be known that biaxially oriented monolayer containers produced from PEN blended with up to about 30 wt % EVOH (based on the combined weight of PEN and EVOH) would result in unexpectedly low oxygen permeability when compared to such containers produced from PET and EVOH.

PEN is useful for producing monolayer biaxially oriented containers having good barrier against oxygen ($O_2$), carbon dioxide, and water vapor permeation. PEN may be processed by injection stretch blow molding (single stage) or reheat stretch blow molding (two stage) to produce a variety of container shapes having about 1.5 cc mil/100 in$^2$-24 hr at 30° C. and 68% RH oxygen permeability (1.5 PU) and 0.90 g mil/100 in.$^2$/24 hr at 100° F. and 90% RH (TR) Water Vapor Transmission Rate (WVTR). Using the polymer blends of the present invention, the $O_2$ barrier of these containers can be reduced to about 0.10 PC while maintaining the WVTR to about 0.9 TR. PU, or permeability unit, is defined as the number of cc's of gas permeating a 1-mil thick sheet of 100 in.$^2$ in 24 hr at 30° C. and 68% relative humidity. TR is defined as number of grams of water vapor permeatig a 1-mil thick sheet of 100 in.$^2$ in 24 hr at 100° F. and 90% relative humidity.

The improveemnt in gas barrier properties is attained without sacrificing physical properties of containers, and the containers produced by this process result in an attractive pearlescent appearance.

DESCRIPTION OF THE DRAWINGS

FIGS. 1 and 2 are photomicrographs of the sidewall section of a biaxially oriented bottle made from PEN and EVOH at 90/10 and 80/20 ratios respectively.

DISCLOSURE OF INVENTION

According to the present invention, there is provided a polymer blend useful in producing stetch-blown, (sometimes referred to as biaxially oriented) hollow articles or containers (herein sometimes referred to as "container") which have improved gas barrier properties. The article comprises a blend of PEN and EVOH, the amount of EVOH being up to about 30% by weight based on the combined weight of PEN and EVOH and sufficient to reduce the oxygen permeability of the article. Preferably, the blend comprises about 80 to about 99% by weight PEN, and about 20 to about 1% by weight EVOH, the percentages being based on the combined weight of PEN and EVOH. Most preferably, the blend comprises about 80 to about 95% by weight PEN and about 20 to about 5% by weight EVOH, based on the combined weight of PEN and EVOH.

The article described above is produced by blending pellets of the PEN and EVOH polymers, injection molding a parison, followed by stretch-blow molding the article in accordance with conventional techniques.

Figure 3:
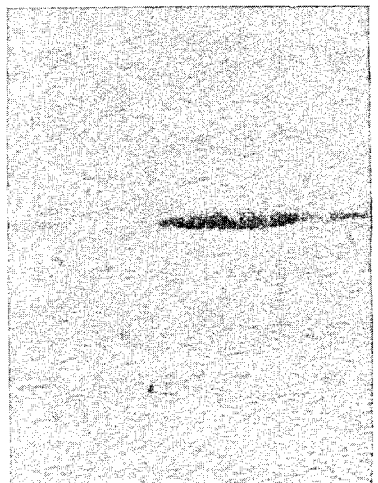
FIGS. 3 and 4 are photomicrographs of the sidewall section of a biaxially oriented bottle made from PET and EVOH at 90/10 and 80.20 ratios respectively.
Figure 4:
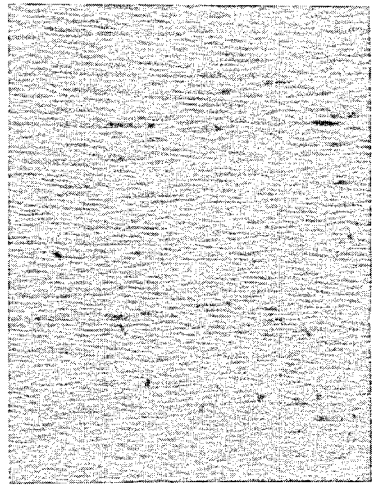

Unexpectedly, when the stretch-blow molded article is formed in accordance with this invention, the EVOH behaves in an enexpected manner. This phenomenon is illustrated in FIGS. 1-4, wherein the photomicrographs of the sidewall section of a biaxailly oriented bottle made from a PET and EVOH blend shows the EVOH in the form of generally rounded particles. In comparison, the sidewall section of a biaxially oriented bottle made from a PEN and EVOH blend shows the EVOH in the form of drawn-out, sheet-like formations or platelets which are believed to form large barricades to the passage of oxygen.

U.S. Pat. No. 4,261,473 by Yamada et al., discloses that blends of EVOH with a number of polyesters and nylons would produce containers with improved barrier properties. Among the polyesters disclosed in this patent is PET. PET when blended with EVOH has been shown to give $O_2$ barrier results in 2-liter bottles as follows:

| Percent EVOH in the Blend | $O_2$ Permeability, PU's |
| --- | --- |
| 0 | 5.90 |
| 5 | 3.44 |
| 10 | 1.76 |
| 15 | 1.46 |
| 20 | 0.82 |

The permeability of the blend may be considered to be a comprise of the two components. Assuming the contribution of PET to be 5.90 PU, the contribbution of EVOH can be calculated as follows:

$$1/P = (100-E)/(5.9 \cdot 100) + (E)/(X \cdot 100)$$

where

P is the permeability of the blend
E is the percent EVOH in the blend, and
X is the effective permeability of EVOH in the blend.

Using this calculation with the above PET-EVOH blend permeabilities, the following effective EVOH permeabilities are obtained:

| Percent EVOH in the Blend | Effective EVOH O$_2$ Permeability, PU's |
|---|---|
| 0 | 0.386 |
| 10 | 0.241 |
| 15 | 0.277 |
| 20 | 0.185 |

Using these same (for PET) effective EVOH permeabilities for PEN, the following permeabilities would be expected for PEN/EVOH blends:

| | O$_2$ Permeability, PU's | |
|---|---|---|
| Percent EVOH in the Blend | Expected | Actual |
| 0 | 1.06 | 1.06 |
| 5 | 0.97 | 0.59 |
| 10 | 0.79 | 0.21 |
| 15 | 0.74 | 0.15 |
| 20 | 0.54 | 0.10 |

As may be seen, the actual values are 4 to 5 times lower than were expected based on the PET data. An analysis of photomicrographs of cross sections of bottle sidewalls gives an indication as to why the EVOH is more effective in PEN than in PET. As may be seen in FIGS. 3 and 4, the EVOH exists in the PET matrix as discreet particles that are only partly elongated. The same amount of EVOH in the PEN matrix gives a much more uniform distribution with very well elongated, sheet-like sections as shown in FIGS. 1 and 2. These elongated sections make for a more difficult path for O$_2$ molecules to transverse through the bottle sidewall.

The term "poly(ethylenenaphthalene 2,6-dicarboxylate)", or PEN as used herein, is the polyester of 2,6-naphthalene dicarboxylic acid and ethylene glycol, and includes copolymers thereof. PEN useful in preparing the articles of this invention includes (a) polymers wherein at least about 97% of the polymer contains the repeating ethylenenaphthalene 2,6-dicarboxylate unit, with any remainder being minor amounts of esterforming components, and (b) copolymers of ethylenenaphthalene 2,6-dicarboxylate wherein up to about 10 mole percent of the copolymer is prepared from the monomer units of diethylene glycol; propane-1,3-diol; butane-1,4-diol; polytetramethylene glycol; polyethylene glycol; polypropylene glycol; 1,4-cyclohexanedimethanol; neopentyl glycol and the like, substituted for the glycol moiety in the preparation of the copolymer or isophthalic; bibenzoic, naphthalene 1,4- or 2,6-dicarboxylic; adipic; sebacic; decane-1,10-dicarboxylic, diglycolic acid and the like, substituted for the acid moiety in the preparation of the copolymer.

In addition, the polymer mixture can include various additives that do not adversely affect the polymer in use such as stabilizers, e.g., antioxidants or ultraviolet light screening agents, extrusion aids, additives designed to make the polymer more degradable or cumbustible, such as oxidation catalyst, as well as dyes or pigments.

The PEN should have an inherent viscosity (0.5% concentration of polymer in a 40/60 weight percent solution of tetrachloroethane/phenol, respectively, at 25° C.) of at least about 0.50 to about 0.90 prior to blending and molding to obtain the desired end properties in the articles formed and preferably the inherent viscosity is at least about 0.7 to obtain an article having excellent toughness properties, i.e., resistance to impact loading. Especially preferred polyesters include those in which essentially all of the ester forming components are (1) naphthalene 2,6-dicarboxylic acid and ethylene glycol, or (2) naphthalene 2,6-dicarboxylic acid, at least 95 mol % ethylene gylcol and up to 5 mol % 1,4-cyclohexanedimethanol. Such polyesters and their preparation are described in the art and are also commercially available.

Olefin/vinyl alcohol copolymers useful in this invention include those wherein the olefin content of the copolymer is between about 5.0 and about 40% by weight and the residual ester content of the vinyl alcohol portion is below 3.0%. It is preferred that the differential thermal analysis curve for the copolymer be a single narrow endotherm having a melting range of less than 30° C. Also, the olefin content of the copolymer should be maintained within a narrow distribution range and significant amounts of homopolymer segments of either olefin or vinyl alcohol should be avoided.

The olefin distribution range and the presence of homopolymers is most conveniently measured using differential thermal analysis (DTA) techniques. The differential thermal analysis (DTA) is carried out according to the procedure set forth by D. A. Vassallo and J. C. Harden in Analytical Chemistry, volume 34, January, 1962, pages 132–5, using a Du Pont 900 Differential Thermal Analyzer programmed at a 30° C./minute rate. A DTA curve wherein the curve is characterized by a single narrow melting endotherm having a range of less than 30° C. indicates a narrow olefin distribution in the copolymer.

An example of the preparation of a preferred ethylene/vinyl alcohol copolymer is as follows.

1250 Grams of vinyl acetate monomer is charged to a one-gallon stainless steel autoclave equipped with an internal cooling coil an agitation means. The vessel and contents are cooled to 15° C. by circulating cold water in the cooling coil. 1.125 Grams of solid isopropyl percarbonate is added to 1250 grams of vinyl acetate previously cooled to −40° C. The percarbonate dissolves readily with gentle agitation and the solution is then poured into the autoclave. The autoclave is pressurized while maintaining agitation, with 100 psig (7.03 kg/cm$^2$ gage) ethylene and then vented to 0 psig (atmospheric pressure). The autoclave is purged twice again in the same manner in order to remove any oxygen from the autoclave and its contents. Then the reaction temperature is increased to 45° C. by means of an external electrical heating mantle; the pressure is 100 psi (7.03 kg/cm$^2$) before heating and additional ethylene is added to bring the pressure to 450 psi (31.6 kg/cm$^2$) simultaneously with the temperature rise to 45° C. The reaction temperature is controlled between 45 and 46° C. The autoclave is vented several times during the run in order to maintain a constant pressure of 450 psi (31.6 kg/cm$^2$). The cooling of the monomer and the simultaneous increase in temperature and pressure is carried out to avoid any premature polymerization that would result in any homopolymer segments. After four hours reaction time, a monomer conversion of 35.8% is achieved. The autoclave contents are cooled rapidly to 20° C. without venting of pressure and the contents are dumped into two volumes of methanol containing 0.1% by weight of inhibited styrene monomer which process acts to rapidly quench the polymerization process and avoid residual polymerzation that may produce segments of homopolymer. The ethylene/vinyl acetate resin is recovered within 24 hours by disintegration of the varnish into several volumes of hexane. The resin, which is dried overnight at 75° C., has an ethylene content of 13.5% by weight and a viscosity number of 0.763 dl/g in toluene (0.25 g/100 ml) at 25° C.

The foregoing ethylene/vinyl acetate polymer is hydrolyzed to form ethylene/vinyl acetate groups. The hydrolysis is carried out using a 4% by weight solution of sodium hydroxide in methanol according to the procedures well known to those skilled in the art.

The hydrolyzed ethylene/vinyl alcohol resin has a viscosity number of 1.414 dl/g in dimethyl sulfoxide (0.25 g/100 ml) at 25° C.

A differential thermal analysis (DTA) curve of the hydrolyzed polymer shows a single narrow melting endotherm (DTA) having a range of 15° C. with a minimum at 177° C. The narrow endotherm indicates that the ethylene/vinyl alcohol polymer has a narrow ethylene distribution, i.e., the individual chain segments that make up the polymer mass have a narrow ethylene distribution around a mean which is the total amount of ethylene in the copolymer. The single melting endotherm indicates that the polymer does not have significant amounts of homopolymer in the resin.

Suitable vinyl esters which can be copolymerized with the olefin comonomers and subsequently hydrolyzed to form the olefin/vinyl alcohol copolymers of this invention include vinyl ester monomers of the general formula:

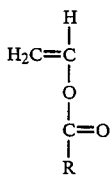

wherein R is selected from the group comprising hydrogen, alkyl groups of from 1 to 10 carbons atoms, aryl groups of from 6 to 10 carbon atoms including the carbon atoms in ring substituted alkyl subtituents, e.g., vinyl formate, vinyl acetate, vinyl propionate, vinylbutyrate, vinyl benzoate and the like. Preferably, the vinyl ester is vinyl acetate.

The preferred olefin/vinyl alcohol materials are ethylene/vinyl alcohol copolymers and wherein the olefin content is from 5 to 40 weight percent based on the weight of the copolymer. The residual ester content of the copolymer should be less than 3% and preferably less than 2% by weight. Most preferably the residual ester content is less than 1% by weight. The preferred ethylene/vinyl alcohol copolymer resins will contain less than 2% hompopolymers. Especially preferred are homopolymers with less than 1% homopolymer. An example of a preferred copolymer is EVAL F resin marketed by Kuraray Company.

In the preparation of the preferred copolymers, the ethylene and the vinyl ester are polymerized in the presence of a free radical initiator to a conversion of from 20 to 70% at temperatures between −50° C. and 100° C.

The choice of initiator system is based on the necessity for minimizing chain transfer reactions such as hydrogen abstraction; solubility in the polymerization medium; and a half-life for radical generation generally between 0.1 to 100 hours and preferably between 0.5 to 5 hours. These initiators considerations are well known to those skilled in the art and need no further discussion here.

Examples of suitable initiators that meet the above requirements include the alkyl boranes such as triethyl borane, tripropyl borane, tributyl borane, etc. Tributyl borane is especially preferred for polymerization at subambient temperatures. Also included are azobis compounds such as azobisisobutyronitrile; organic and inorganic peroxy and hydroperoxy compounds such as salts of persulfuric acid, benzoyl peroxide, isopropyl percarbonate, hydrogen peroxide, etc,; the so-called redox combinations such as t-butylhydroperoxide/sodium formaldehyde sulfoxalate, etc.

Organic solvent, which may also be included in the polymerization charge, has the advantage of tending to increase the ethylene content of the polymer for a given polymerization pressure. Solvents are also useful for limiting the molecular weight achieved during polymerization. For this reason, solvents are not used at all when it is desired to maximize molecular weight. For example, only 1% of methanol on the charge causes a significant reduction in polymer molecular weight. Examples of suitable solvents include alcohols, ketones, esters, aromatic hydrocarbons, etc.

In order to obtain a copolymer suitable for use in this invention, wherein the copolymer has a narrow range of olefin distribution and has no significant amounts of homopolymer, certain critical steps in the polymerization process must be observed. An outline of these steps is set forth below.

(1) Monomer conversion should be held to amounts in the range of from 1 to 70% conversion with 5 to 45% being the preferred range.

(2) Prior to and during the polymerization reaction, the reactor system and reactants, solvents, should be purged free of oxygen.

(3) Conditions which would permit polymerization prior to the stabilization reaction temperature and olefin pressure or during the recovery step should be avoided.

(4) A constant temperature and constant olefin pressure should be maintained during the polymerization reaction. In this regard, the temperature should be maintained within ±5° C. and the olefin pressure with ±5% of the pressure specified for any given system.

Such olefin/vinyl alcohol polymers and their preparation are known in the art. See, for example, U.S. Pat. No. 3,585,177, the specification of which is incorporated herein by reference.

Biaxial orientation of the articles of the present invention is useful to impart improved physical properties such as improved tensile strength and yield stresses. Biaxial orientation is accomplished by stretching the thermoplastic in the axial and hoop directions as the article is being formed, thus, the term "stretch-blow molding" is used herein. The article of the present invention is molecularly oriented by being biaxially stretched an average of about up to 4.0 times in the axial direction and about 2.5 to 7.0 times in the hoop direction. The extent of the molecular orientation can be determined by known techniques. One method of determining molecular orientation is described in The Journal of Polymer Science, Vol. XLVII, pages 289–306 (1960), entitled "X-Ray Determination of the Crystallite Orientation Distribution of Polyethylene Terephthalate Films," by C. J. Heffelfinger and R. L. Burton; and "Structure and Properties of Oriented Poly(ethylene Terephthalate) Films," by Heffelfinger and Schmidt in the Journal of Applied Polymer Sciences, Vol. 9, page 2661 (1965).

Biaxial orientation provides excellent strength properties. Articles typically do not have the same degree of orientation at every point on the article; however, the areas that are less oriented have a thicker shell than the areas that are more highly oriented, thereby providing relatively high overall strength to the article. In preparing a bottle, the thinnest shell thickness occurs in the right cylinder se4ction; however, this section is the most highly oriented.

The density (grams per cubic centimeter) of the article can range from about 1.333 to 1.402. Density is measured by the method described in ASTM 1505, entitled "Density Gradient Technique." Density is a measure of the crystallinity and this density range includes a crystallinity range of about 0 to 60%. The present crystallinity is calculated from the following equation:

$$\text{Percent Crystallinity} = \frac{Ps - Pa}{Pc - Pa} \times 100$$

where
Ps = density of test sample (g/cm$^3$)
Pa = 1.333 (g/cm$^3$), density of amorphous film of zero percent crystallinity
Pc = 1.455 (g/cm$^3$), density of the crystal calculated from unit cell parameters.

The formed articles themselves can have varying crystallinities along the axial length of each article, in which case, if desired, the article can be heat-set to achieve a uniform crystallinity in each article.

Prior to carrying out the process, the PEN and EVOH (both normally in particulate form) may be mixed so that the resulting composition has up to about 30 wt % EVOH, preferably about 80-99% (preferably 80-95%) by weight PEN and about 20-1% (preferably 20-5%) by weight EVOH. Mixing may be carried out in conventional manner by mixing the particles, melt blending, etc., as is well known by those skilled in the art. Conventional additives such as dyes, stabilizers, etc., may be added.

The method by which the parisons are formed is not a part of this invention. However, the parisons from which the articles are blow-molded may be conveniently formed using conventional injection molding techniques well known to those skilled in the art. The parisons may be formed by injection-stretch blow molding (single stage) or reheat stretch blow molding (two stage). They are subsequently blow-molded using conventional techniques well known to those skilled in the art.

Patents of interest regarding forming parisons and stretch-blow molding the parisons into finished containers are U.S. Pat. Nos. 3,778,214 and 3,733,309. These patents are incorporated herein by reference.

The parison surface temperature may be measured as follows:

A 57-gram parison is heated for a specified time by quartz heaters while spinning on a mandrel. At the end of the specified heating period, the parison is removed from the heating position to the container molding position and placed on another mandrel with the container mold open. In this position, the parison surface temperature is monitored with an IRCON infrared thermometer mounted to the side about one foot from and centered on the parison. The parison surface temperature is monitored for a 25-second period with the infrared thermometer and the temperature recorded at the end of this time. Normally during this time, the container mold would be closed and a bottle stretch-blown at the end of the 25-second period. However, for the purpose of obtaining the temperature of the parison surface at the instant of stretch-blowing, the mold is left open and the surface temperature monitored with an infrared thermometer.

The following examples are submitted for a better understanding of the invention.

EXAMPLE 1

Pellet/pellet blends of PEN and EVOH, containing from 5 to 20 wt % EVOH in the blends, were prepared from materials that had been dried (at 212° F. for the EVOH and at 300° F. for the PEN) is a dessicant dryer for a minimum of 16 hours. The blends were injection molded into 57-gram preforms at a melt temperature of about 600° F. with a Cincinnati Milacron 150-ton, 6-ounce molding machine. The opaque preforms produced were used with a laboratory reheat stretch blow mold (RHB) machine at about 300° F. (preform surface temperature) to obtain biaxially oriented 2-liter bottles. The bottles had the following properties:

|  | Percent EVOH in the Blend | | | | |
|---|---|---|---|---|---|
|  | 0 | 5 | 10 | 15 | 20 |
| Inherent Viscosity, dl/g | 0.56 | 0.43 | 0.39 | 0.42 | 0.57 |
| Sidewall Density, g/cc | 1.348 | 1.338 | 1.318 | 1.316 | 1.314 |
| O$_2$ Permeability, PU's | 1.06 | 0.59 | 0.21 | 0.15 | 0.10 |
| WVTR, TR's | 0.93 | 1.07 | 0.70 | 0.80 | 0.89 |
| Tensile Strength, Psi × 10$^3$ | | | | | |
| Hoop | 34 | 26 | 30 | 30 | — |
| Axial | 27 | 19 | 21 | 24 | 21 |
| Elongation, % | | | | | |
| Hoop | 10 | 27 | 17 | 14 | — |
| Axial | 52 | 27 | 34 | 35 | 19 |
| Modulus, psi × 10$^5$ | | | | | |
| Hoop | 7 | 6 | 7 | 7 | 7 |
| Axial | 6 | 5 | 5 | 6 | 5 |

EXAMPLE 2

Pellel/pellet blends of PET and EVOH, containing from 5 to 20% wt % of EVOH in the blends, were prepared from materials that has been dried (at 212° F. for the EVOH and at 300° F. for the PET) in a dessicant dryer for a minimum of 16 hours. The blends were injection molded into 57-gram preforms at about 530° F. with a Cincinnaait Milacron 150-ton, 6-ounce machine. The opaque preforms produced were used with a laboratory RHB machine at about 210° F. (preform surface temperature) to obtain biaxially oriented 2-liter bottles. These bottles had the following properties:

|  | Percent EVOH in the Blend | | | | |
|---|---|---|---|---|---|
|  | 0 | 5 | 10 | 15 | 20 |
| Inherent Viscosity, dl/g | 0.66 | 0.72 | 0.72 | 0.75 | 0.76 |
| Sidewall Density, | 1.363 | 1.345 | 1.340 | 1.333 | 1.327 |

-continued

| | Percent EVOH in the Blend | | | | |
|---|---|---|---|---|---|
| | 0 | 5 | 10 | 15 | 20 |
| g/cc | | | | | |
| $O_2$ Permeability, PU's | 5.90 | 3.44 | 1.76 | 1.46 | 0.82 |
| WVTR, TR's | 2.79 | 3.06 | 2.48 | 2.21 | 2.10 |
| Tensile Strength, psi × $10^3$ | | | | | |
| Hoop | 33 | 31 | 31 | 30 | 32 |
| Axial | 16 | 23 | 17 | 23 | 22 |
| Elongation, % | | | | | |
| Hoop | 30 | 27 | 31 | 33 | 32 |
| Modulus, psi × $10^5$ | 125 | 176 | 153 | 67 | 89 |
| Hoop | 7 | 5 | 5 | 5 | 5 |
| Axial | 3 | 2 | 3 | 4 | 3 |

In the examples, physical properties are measured as follows:

| Tensile Strength at Yield | ASTM D882 |
|---|---|
| Tensile Strength at Break | ASTM D882 |
| Elongation at Break | ASTM D882 |
| Tensile Modulus | ASTM D882 |

Unless otherwise specified, inherent viscosity is measured in a 60/40 parts by weight solution of phenol/tetrachloroethane 25° C. and at a concentration of about 0.5 gram of polymer in 100 ml of the solvent.

Where acids are specified herein in the formation of the polyesters or copolyesters, it should be understood that ester forming derivatives of the acids may be used rather than the acids themselves as in conventional practice. For example, dimethyl isophthalate may be used rather than isophthalic acid.

In the examples, oxygen permeability is determined according to ASTM D 3985, in cubic centimeters permeating a 1-mil thick sample, 100 inches square, for a 24-hour period under oxygen partial pressure difference of one atmosphere at 30° C. and 68% relative humidity using a MOCON Oxtran 10-50 instrument. Oxygen permeability is also given in S.I. (Systems International) units in cubic centimeters permeating a 1 cm thick sample, 1 cm square, for 1 second at atmospheric pressure.

Unless otherwise specified, all parts, ratios, percentages, etc., are by weight.

The invention has been described in detail with particular reference to preferred embodiments thereof, but it will be understood that variations and modifications can be effected within the spirit and scope of the invention.

We claim:

1. A biaxially oriented container having improved resistance to oxygen permeability, the composition of which comprises about 70–99 weight % poly(ethylenenaphthalene 2,6-dicarboxylate) and dispersed therein, about 30–1 weight % olefin/vinyl alcohol copolymer.

2. A container according to claim 1 wherein said olefin is ethylene.

3. A container according to claim 1 wherein said olefin/vinyl alcohol is dispersed in said poly(ethylenenaphthalene 2,6-dicarboxylate) and exists as thin, elongated sheet-like formations.

4. A biaxially oriented container having improved resistance to oxygen permeability, the composition of which comprises about 70–99 weight % poly(ethylenenaphthalene 2,6-dicarboxylate) having dispersed therein, about 30–1 weight % ethylene/vinyl alcohol copolymer, existing as elongated sheet-like formations.

5. A biaxially oriented shaped article comprising a polymer blend having improved resistance to oxygen permeability, when formed into a biaxially oriented container, said polymer blend containing about 80 to 99% by weight poly(ethylene naphthalene 2,6-dicarboxylate) and about 20 to 1% by weight olefin/vinyl alcohol copolymer.

* * * * *